(12) United States Patent
Banerjee et al.

(10) Patent No.: US 12,506,343 B2
(45) Date of Patent: Dec. 23, 2025

(54) GENERATOR-RECTIFIER SYSTEM AND GRID INTERFACE

(71) Applicant: THE BOARD OF TRUSTEES OF THE UNIVERSITY OF ILLINOIS, Urbana, IL (US)

(72) Inventors: Arijit Banerjee, Urbana, IL (US); Debranjan Mukherjee, Champaign, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 227 days.

(21) Appl. No.: 18/321,894

(22) Filed: May 23, 2023

(65) Prior Publication Data

US 2024/0006889 A1    Jan. 4, 2024

Related U.S. Application Data

(60) Provisional application No. 63/344,990, filed on May 23, 2022.

(51) Int. Cl.
*H02M 1/00* (2007.01)
*H02J 3/38* (2006.01)
(Continued)

(52) U.S. Cl.
CPC ........... *H02J 3/381* (2013.01); *H02M 1/0077* (2021.05); *H02M 3/33507* (2013.01); *H02M 7/219* (2013.01); *H02J 2300/28* (2020.01)

(58) Field of Classification Search
CPC ......... H02M 7/219; H02M 1/007–0077; H02J 3/381; H02J 2300/28
See application file for complete search history.

(56) References Cited

U.S. PATENT DOCUMENTS

| | | | |
|---|---|---|---|
| 6,184,593 B1 * | 2/2001 | Jungreis | H02J 9/066 307/64 |
| 7,459,889 B2 * | 12/2008 | Ganev | H02P 1/00 322/59 |

(Continued)

OTHER PUBLICATIONS

Barrera-Cardenas, et al., "Comparative Study of Wind Turbine Power Converters Based on Medium-Frequency AC-Link for Offshore DC-Grids", IEEE Journal of Emerging and Selected Topics in Power Electronics, 2015, vol. 03, No. 2, pp. 525-541.

(Continued)

*Primary Examiner* — Sisay G Tiku
(74) *Attorney, Agent, or Firm* — Greer, Burns & Crain, Ltd.; Steven P. Fallon

(57) ABSTRACT

A generator-rectifier system and grid interface includes an active rectifier that accepts an input from an ac port of a multi-port permanent magnet synchronous generator. Passive rectifiers are connected to the others of the plurality of ac ports. Connections provide outputs of the active and passive rectifiers. A first converter operates at a fixed duty ratio driven by the outputs to interface with a dc grid or at a low grid frequency switching waveform to create a grid frequency ac output to interface with an ac grid. A second converter is connected the output of the active rectifier, and is controlled at a variable duty ratio to interface with the dc grid or an above-grid frequency switching waveform to create an above-grid frequency ac waveform to interface with an ac grid. Connections provide a serial stack of outputs of the first and second converters.

14 Claims, 11 Drawing Sheets

(51) Int. Cl.
H02M 3/335 (2006.01)
H02M 7/219 (2006.01)

(56) References Cited

U.S. PATENT DOCUMENTS

| | | | | |
|---|---|---|---|---|
| 10,122,306 B2* | 11/2018 | Rozman | ................ | H02M 7/04 |
| 11,183,946 B2 | 11/2021 | Huynh et al. | | |
| 2007/0247004 A1* | 10/2007 | Tan | ........................ | H02J 1/10 |
| | | | | 307/66 |
| 2012/0126758 A1* | 5/2012 | Fang | ..................... | H02P 25/22 |
| | | | | 322/29 |
| 2013/0002022 A1* | 1/2013 | McMullen | ............... | H02J 3/30 |
| | | | | 307/46 |
| 2015/0349655 A1* | 12/2015 | Petersen | .............. | H02M 5/458 |
| | | | | 363/35 |
| 2018/0262137 A1* | 9/2018 | Rozman | .................... | H02P 9/48 |
| 2020/0295671 A1* | 9/2020 | Huynh | .................... | H02J 3/381 |
| 2022/0416700 A1* | 12/2022 | Gehret | ..................... | H02J 3/381 |
| 2023/0299659 A1* | 9/2023 | Banerjee | ................. | H02M 7/10 |
| | | | | 290/44 |
| 2024/0063635 A1* | 2/2024 | Wilhide | .................. | B60L 50/15 |
| 2025/0125624 A1* | 4/2025 | Farb | ........................ | F03D 9/257 |

OTHER PUBLICATIONS

Chen, et al., "Analysis and Comparison of Medium Voltage High Power DC/DC Converters for Offshore Wind Energy Systems", IEEE Transactions on Power Electronics, 2013, vol. 28, No. 4, pp. 2014-2023.
Chuangpishit, et al., "Topology Design for Collector Systems of Offshore Wind Farms With Pure DC Power Systems", IEEE Transactions on Industrial Electronics, 2014, vol. 61, No. 1, pp. 320-328.
Fu, et al., "Collection System Topology for Deep-Sea Offshore Wind Farms Considering Wind Characteristics", IEEE Transactions on Energy Conversion, 2022, vol. 37, No. 1, pp. 631-642.
Guan, Minyuan, "A Series-Connected Offshore Wind Farm Based on Modular Dual-Active-Bridge (DAB) Isolated DC-DC Converter", IEEE Transactions on Energy Conversion, 2019, vol. 34, No. 3, pp. 1422-1431.
Guo, et al., "HB and FB MMC Based Onshore Converter in Series-Connected Offshore Wind Farm", IEEE Transactions on Power Electronics, 2020, vol. 35, No. 3, pp. 2646-2658.
Guo, et al., "Series-Connected-Based Offshore Wind Farms With Full-Bridge Modular Multilevel Converter as Grid- and Generator-side Converters", IEEE Transactions on Industrial Electronics, 2020, vol. 67, No. 4, pp. 2798-2809.
Hu, et al., "Modular Isolated LLC DC/DC Conversion System for Offshore Wind Farm Collection and Integration", IEEE Journal of Emerging and Selected Topics in Power Electronics, 2021, vol. 9, No. 6, pp. 6713-6725.
Huynh, Phuc, "Active Voltage-Ripple Compensation in an Integrated Generator-Rectifier System", IEEE Transactions on Power Electronics, 2021, vol. 36, No. 2, pp. 2270-2282.
Huynh, et al., "Maximum Power Point Tracking for Wind Turbine Using Integrated Generator-Rectifier Systems", IEEE Transactions on Power Electronics, 2021, vol. 36, No. 1, pp. 504-512.
Huynh, et al., "An Integrated Permanent-Magnet-Synchronous Generator-Rectifier Architecture for Limited-Speed-Range Applications", IEEE Transactions on Power Electronics, 2020, vol. 35, No. 5, pp. 4767-4779.
Jia, et al., "Control Strategy for an Open-End Winding Induction Motor Drive System for Dual-Power Electric Vehicles", IEEE Access, 2020, Bol. 8, pp. 8844-8860.
Kolar, et al., "A Novel Three-Phase Utility Interface Minimizing Line Current Harmonics of High-Power Telecommunications Rectifier Modules", IEEE Transactions on Industrial Electronics, 1997, vol. 44, No. 4, pp. 456-467.
Krishnamoorthy, et al., "Isolated AC-DC Converter Using Medium Frequency Transformer for Off-Shore Wind Turbine DC Collection Grid", IEEE Transactions on Industrial Electronics, 2017, vol. 64, No. 11, pp. 8939-8947.
Meyer, et al., "Control and Design of DC Grids for Offshore Wind Farms", IEEE Transactions on Industry Applications, 2007, vol. 43, No. 6, pp. 1475-1482.
Mukherjee, et al., "A Reduced Switch Hybrid Multilevel Unidirectional Rectifier", IEEE Transactions on Power Electronics, 2019, vol. 34, No. 3, pp. 2070-2081.
Mukherjee, et al., "A Minimum Switch Five-Level Unidirectional Rectifier Without Any Voltage Balancing and Pre-Charging Circuitry", IEEE Transactions on Power Electronics, 2019, vol. 34, No. 12, pp. 11605-11615.
Nabae, et al., "A New Neutral-Point-Clamped PWM Inverter", IEEE Transactions on Industry Applications, 1981, vol. IA-17, No. 5., pp. 518-523.
Pape, et al., "A Generic Power Converter Sizing Framework for Series-Connected DC Offshore Wind Farms", IEEE Transactions on Power Electronics, 2022, vol. 37, No. 2, pp. 2307-2320.
Popat, et al., "A Novel Decoupled Interconnecting Method for Current-Source Converter-Based Offshore Wind Farms", IEEE Transactions on Power Electronics, 2012, vol. 27, No. 10, pp. 4224-4233.
Rodríguez, et al., "Multilevel Voltage-Source-Converter Topologies for Industrial Medium-Voltage Drives", IEEE Transactions on Industrial Electronics, 2007, vol. 54, No. 6, pp. 2930-2945.
Rong, et al., "ALL-DC Offshore Wind Farm With Series-Connected Wind Turbines to Overcome Unequal Wind Speeds", IEEE Transactions on Power Electronics, 2019, vol. 34, No. 2, pp. 1370-1381.
Rong, et al., "The study of different unidirectional input parallel output series connected DC-DC converters for wind farm based multi-connected DC system", Int Trans Electr Energ Syst., 2021, pp. 1-16.
Wei, et al., "A Medium-Frequency Transformer-Based Wind Energy Conversion System Used for Current-Source Converter-Based Offshore Wind Farm", IEEE Transactions on Power Electronics, 2017, vol. 32, No. 1, pp. 248-259.
Wei, et al., "Bipolar Operation Investigation of Current Source Converter Based Wind Energy Conversion Systems", IEEE Transactions on Power Electronics, 2018, vol. 33, No. 2, pp. 1294-1302.
Zhang, et al., "Overvoltage Limitation Method of an Offshore Wind Farm with DC Series-Parallel Collection Grid", IEEE Transactions on Sustainable Energy, 2019, vol. 10, No. 1, pp. 204-213.

* cited by examiner

US 12,506,343 B2

GENERATOR-RECTIFIER SYSTEM AND GRID INTERFACE

PRIORITY CLAIM AND REFERENCE TO RELATED APPLICATION

The application claims priority under 35 U.S.C. § 119 and all applicable statutes and treaties from prior U.S. provisional application Ser. No. 63/344,990 which was filed May 23, 2022, which application is incorporated by reference herein.

STATEMENT OF GOVERNMENT INTEREST

This invention was made with government support under DE-AR0001057 awarded by the US Department of Energy. The United States Government has certain rights in the invention.

FIELD

Fields of the invention includes power generation and rectification. An example application of the invention is to a wind-energy power generation system.

BACKGROUND

Permanent magnet synchronous generators (PMSGs) have been the preferred choice for offshore wind energy harvesting systems. PMSGs have good torque density, efficiency, reliability, and fault ride through capability. AC-DC converters interface between the variable-voltage variable-frequency type output of the PMSGs and a constant dc network. A diode bridge rectifier provides high efficient ac-dc conversion but does not regulate output dc voltage. Additional dc-dc converters with an inversely proportional relationship between the dc-dc converter gain and wind speed are used to regulate dc ouptut. This approach requires high voltage and current rated semiconductor devices, which increases switch volt-ampere (VA) ratings and conduction losses.

A conventional two-level six-switch converter, suitable for low-voltage applications, can regulate both the output dc-link voltage and the input power factor. Neutral-point-clamped and flying-capacitor-based converters are used for medium-voltage (MV) applications. A. Nabae, et al., "A new neutral-point-clamped PWM inverter," IEEE Trans. Ind. Appl., vol. IA-17, no. 5, pp. 518-523, September 1981; J. Rodriguez, S. Bernet, B. Wu, J. O. Pontt, and S. Kouro, "Multi-level voltage-source-converter topologies for industrial medium-voltage drives," IEEE Trans. Ind. Electron., vol. 54, no. 6, pp. 2930-2945, December 2007. High conduction and switching losses are introduced by the number of clamping diodes that increase as the number of levels increases. Dc-link voltage balancing and uneven distribution of losses among the semiconductors further limit capability. Flying-capacitor-based topologies require costly and failure-prone clamping capacitors.

Reduced-switch multilevel rectifiers are suitable for MV generators in an offshore wind energy conversion system. Kolar and F. Zach, "A novel three-phase utility interface minimizing line current harmonics of high-power telecommunications rectifier modules," IEEE Trans. Ind. Electron., vol. 44, no. 4, pp. 456-467, August 1997; D. Mukherjee and D. Kastha, "A reduced switch hybrid multilevel unidirectional rectifier," IEEE Trans. Power Electron., vol. 34, no. 3, pp. 2070-2081, March 2019; D. Mukherjee and D. Kastha, "A minimum switch five-level unidirectional rectifier without any voltage balancing and pre-charging circuitry," IEEE Trans. Power Electron., vol. 34, no. 12, pp. 11605-11615, December 2019. However, these converters process full power, thereby increasing their cost, complexity, and conversion losses.

One prior approach uses an MVDC collection grid within the wind farm followed by an MV to HV conversion stage in the offshore sub-station. See, C. Meyer et al, "Control and design of DC grids for offshore wind farms," IEEE Trans. Ind. Appl., vol. 43, no. 6, pp. 1475-1482, November/December 2007; W. Chen, et al, "Analysis and comparison of medium voltage high power DC/DC converters for offshore wind energy systems," IEEE Trans. Power Electron., vol. 28, no. 4, pp. 2014-2023, April 2013; H. Krishnamoorthy, et al, "Isolated AC-DC converter using medium frequency transformer for offshore wind turbine DC collection grid," IEEE Trans. Ind. Electron., vol. 64, no. 11, pp. 8939-8947, November 2017; P. Hu, et al., "Modular isolated LLC DC/DC conversion system for offshore wind farm collection and integration," IEEE Trans. Emerg. Sel. Topics Power Electron., vol. 9, no. 6, pp. 6713-6725, December 2021.

Another prior approach is a sub-station-less architecture where the dc outputs of several wind turbines are connected in series to form the HVDC. See, M. Popat, B. Wu, and N. R. Zargari, "A novel decoupled interconnecting method for current-source converter-based offshore wind farms," IEEE Trans. Power Electron., vol. 27, no. 10, pp. 4224-4233, October 2012; S. Chuangpishit, A, et al, "Topology design for collector systems of offshore wind farms with pure DC power systems," IEEE Trans. Ind. Electron., vol. 61, no. 1, pp. 320-328, January 2014; R. Barrera-Cardenas and M. Molinas, "Comparative study of wind turbine power converters based on medium-frequency AC-Link for offshore DC-Grids," IEEE Trans. Emerg. Sel. Topics Power Electron., vol. 3, no. 2, pp. 525-541, June 2015; Q. Wei, et al, "A medium-frequency transformer-based wind energy conversion system used for current-source converter-based offshore wind farm," IEEE Trans. Power Electron., vol. 32, no. 1, pp. 248-259, January 2017; Wei, B. et al, "Bipolar operation investigation of current source converter based wind energy conversion systems," IEEE Trans. Power Electron., vol. 33, no. 2, pp. 1294-1302, February 2018; Rong, G. et al, "ALL-DC offshore wind farm with series-connected wind turbines to overcome unequal wind speeds," IEEE Trans. Power Electron., vol. 34, no. 2, pp. 1370-1381, February 2019; M. Guan, "A series-connected offshore wind farm based on modular dual-active-bridge (DAB) isolated DC-DC converter," IEEE Trans. Energy Conyers., vol. 34, no. 3, pp. 1422-1431, September 2019; H. Zhang, et al, "Overvolt-age limitation method of an offshore wind farm with DC series-parallel collection grid," IEEE Trans. Sustain. Energy, vol. 10, no. 1, pp. 204-213, January 2019; G. Guo et al., "HB and FB MMC based onshore converter in series-connected offshore wind farm," IEEE Trans. Power Electron., vol. 35, no. 3, pp. 2646-2658, March 2020; G. Guo et al., "Series-connected-based offshore wind farms with full-bridge modular multilevel converter as grid- and generator-side con-verters," IEEE Trans. Ind. Electron., vol. 67, no. 4, pp. 2798-2809, April 2020; Y. Fu, et al, "Collection system topology for deep-sea offshore wind farms considering wind characteristics," IEEE Trans. Energy Conyers., vol. 37, no. 1, pp. 631-642, March 2022; M. Pape and M. Kazerani, "A generic power converter sizing framework for series-connected DC offshore wind farms," IEEE Trans. Power Electron., vol. 37, no. 2, pp. 2307-2320, February 2022. These prior designs fail to provide an interface of the integrated generator-rectifier topology to a medium voltage dc (MVDC) or high voltage dc (HVDC) grid.

Some of the present inventors have advanced the state of the art with Integrated Generator-Rectifier Systems that minimize ripple. An integrated generator-rectifier topology is a good alternative to harvest energy from offshore wind. In this topology, a turbine is connected to a multiport PMSG. P. T. Huynh, P. J. Wang, and A. Banerjee, "An integrated permanent-magnet-synchronous generator-rectifier architecture for limited-speed-range applications," IEEE Trans. Power Electron., vol. 35, no. 5, pp. 4767-4779, May 2020; P. Huynh, S. Tungare, and A. Banerjee, "Maximum power point tracking for wind turbine using integrated generator-rectifier systems," IEEE Trans. Power Electron., vol. 36, no. 1, pp. 504-512, January 2021; P. Huynh and A. Banerjee, "Active voltage-ripple compensation in an integrated generator-rectifier system," IEEE Trans. Power Electron., vol. 36, no. 2, pp. 2270-2282, February 2021. In these topologies, each port of the PMSG is connected to either a passive or an active rectifier. The dc outputs of these rectifiers are then connected in series to form a dc link. This type of connection limits the amount of power processed by the active rectifier. The reduction in active rectification, along with eliminating passive rectifier bulky filter capacitors by phase-shifting the generator back electromotive forces (EMFs), improves overall system efficiency, power density, and reliability.

P. Huynh and A. Banerjee, U.S. Pat. No. 11,183,946, discloses such an integrated generator-rectifier AC-DC conversion circuit and system that can include serially stacked passive and active rectifiers connected to multiple AC ports of an electrical power generator driven by mechanical energy captured by an energy harvester. The series-stacked passive rectifiers are powered by multiple three-phase AC ports, each of the ports is implemented as a separate magnetic structure. While this avoids coupling between phases, each separate magnetic structure adds significant weight and significant expense.

More recently, some of the present inventors have provided another advance in the art. Banerjee et al., U.S. patent application Ser. No. 18/182,610, filed Mar. 13, 2023, and incorporated by reference herein, discloses an integrated multi-port generator-rectifier device that includes multiple passive output ports provided from a plurality of passive-rectifier windings on a common, single magnetic structure, wherein the passive-rectifier windings interact with a plurality of magnetic poles, wherein the passive rectifier windings are serially connected, wherein each of the passive rectifier windings comprises a pitch that is a fraction of magnet pole pitch and a pattern to magnetically decouple back emf phases of the separate rectifiers, the device further comprising an active port provided by an active rectifier.

SUMMARY OF THE INVENTION

A preferred embodiment provides a generator-rectifier system and grid interface includes an active rectifier configured to accept an input from one of a plurality of ac ports of a multi-port permanent magnet synchronous generator. Passive rectifiers are connected to the others of the plurality of ac ports of the multi-port permanent magnet synchronous generator. Connections provide outputs of the active rectifier and the passive rectifiers. A first converter is controlled at a fixed duty ratio driven by the outputs to interface with a dc grid or at a low grid frequency switching waveform to create a grid frequency ac output to interface with an ac grid. A second converter is connected the output of the active rectifier, the second converter being controlled at a variable duty ratio to interface with the dc grid or an above grid frequency switching waveform to create an above grid frequency ac waveform to interface with an ac grid. Connections provide a serial stack of outputs of the first and second converters.

DETAILED DESCRIPTION OF THE PREFERRED EMBODIMENTS

Figure 1A:
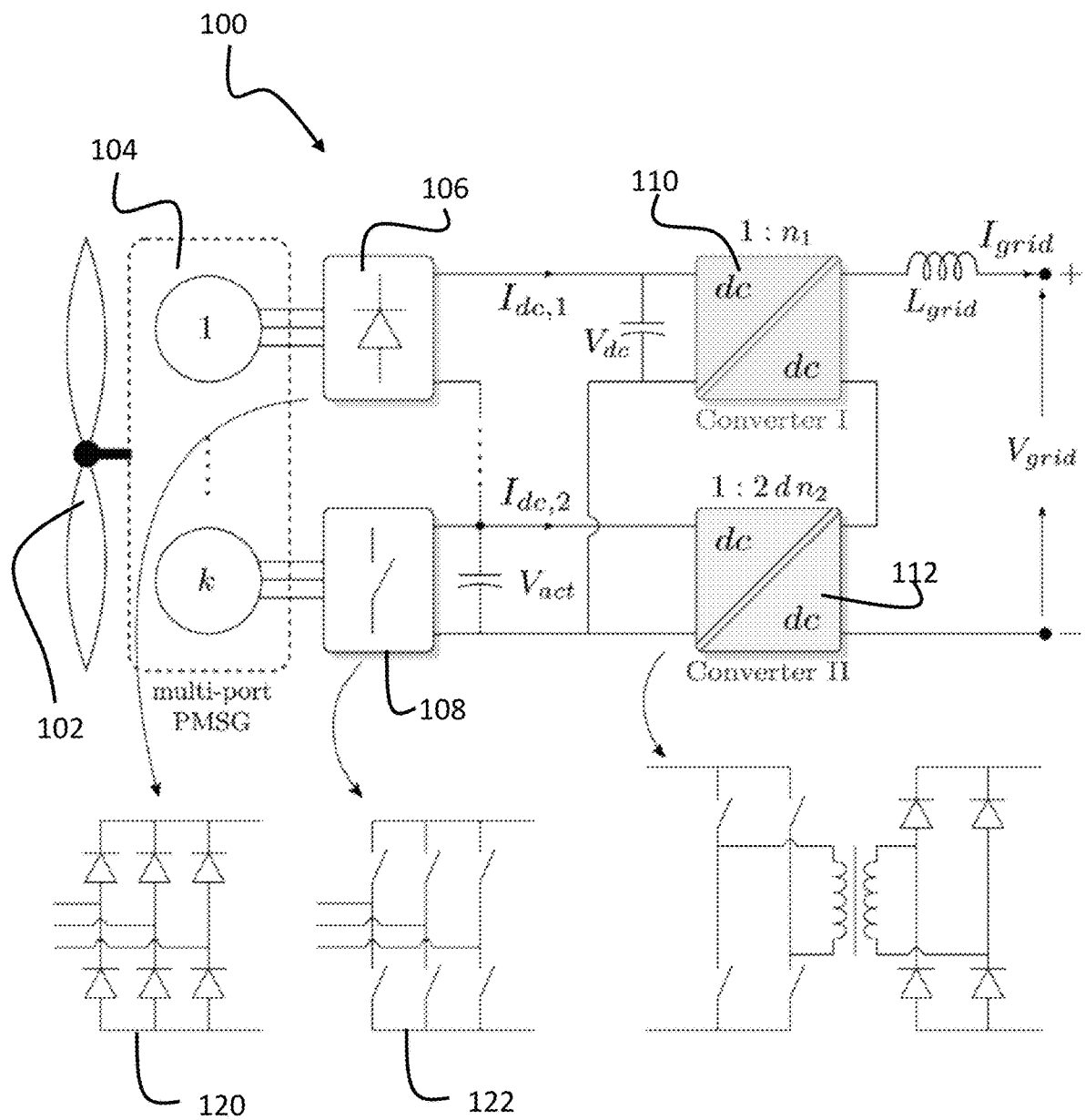
FIG. 1A is a block diagram of a preferred embodiment generator-rectifier system and grid interface in a wind energy generation system for connection to a dc grid, and FIGS. 1B-1C for connection to an ac grid.

Embodiments of the present invention include an integrated generator-rectifier topology/system that can harvest energy from an energy source/system, such as offshore wing. A turbine is connected to a multi-port permanent magnet synchronous generator (PMSG). Each port of the PMSG is connected to either a passive or an active rectifier. Dc outputs of the rectifiers are connected in series to form a dc-link to reduce an amount of power processed by the active rectifier. The reduction in active rectification along with the elimination of passive rectifier bulky filter capacitors by phase-shifting the generator back electromotive forces (EMFs) improve the overall system efficiency, power density, and reliability.

Embodiments of the present disclosure include a dc-grid interface circuit between the integrated generator-rectifier topology and a medium-voltage dc (MVDC) or high voltage dc (HVDC) grid. An isolated dc-dc converter at the integrated generator-rectifier output provides an interface to the dc grid.

Preferred embodiment generator-rectifier systems and grid interfaces include an integrated multi-port generator-rectifier device as disclosed in Banerjee et al., U.S. patent application Ser. No. 18/182,610, filed Mar. 13, 2023, or an integrated multi-port generator-rectifier device as disclosed in Huynh & Banerjee U.S. Pat. No. 11,183,946. A grid-interface architecture includes an isolated dc-dc converter (or dc-ac converter) that directly regulate active-rectifier voltage, further reducing the switch volt-ampere (VA) rating of the overall architecture, e.g. by 14%. In preferred embodiments, the system is designed so that a required VA-rating is minimized. In a preferred implementation, the reduction in the VA rating requirement can provide an overall loss reduction ranging between 28% and 72%, depending on the extracted power. An additional dc-dc converter (or dc-ac converter) used processes a maximum of 7.6% of the total power.

Preferred embodiments include a maximum power point tracking (MPPT) control method based on the relationship between the active-rectifier d-axis current and generated power. Preferred embodiments include an active rectifier dc link voltage controller design.

Preferred embodiments are implemented with a full-bridge (FB) topology. Various other isolated dc-dc converters can be used, including dual active bridge (DAB), single active bridge (SAB), and series resonant converter (SRC). The DAB and SRC topologies require active switches on both sides of the medium-frequency transformer, which is redundant for unidirectional power flow applications such as a wind energy system. Both input and the output of DAB, SAB, and SRC are capacitive. Therefore, these voltages must be regulated to prevent unequal power sharing among the converters when multiple converters are used with their inputs in parallel and outputs in series. This power-balancing scheme requires a complicated control strategy involving many sensors. Further, the active switches, gate-driver components, auxiliary power supplies, capacitors, and sensors on the secondary side of the medium frequency transformer in the DAB, SAB, and SRC topologies require high voltage insulation. Embodiments using the DAB, SAB, and SRC topologies still provide advantages compared to the prior art, but an FB converter topology eliminates shortcomings of the other topologies due to inherent FB characteristics: input is connected to a voltage source, its output behaves like a current-source, and there are no active switches and capacitors on the secondary side.

Preferred embodiments include an integrated generator-converter architecture for an energy system (such as an offshore wind energy system), which reduces the number of active switches and capacitors. Preferred embodiments include a topology that can optimize the total switch VA rating requirement in the architecture.

Preferred embodiments provide an integrated generator-rectifier architecture for harvesting energy from a power source/energy system such as offshore wind. A majority of the power is processed by reliable, efficient, and inexpensive diodes operating at the generator frequency.

Embodiments include a dc grid interface circuit for an integrated-generator-rectifier and a control strategy for maximum power point tracking. In one example, using a 10MW illustrative design, it is shown that the preferred architecture reduces the total switch volt-ampere rating requirement by 22.8% which translates into overall loss reduction ranging between 28.3% and 71.7%, depending on the extracted power.

In preferred embodiments, the maximum power point tracking control method is based upon current and the generated power. Experimental results obtained from a laboratory prototype validate the effectiveness of the converter architecture and its control strategy. This approach provides opportunities for integrating dc-collection networks with offshore wind farms through an efficient, reliable, and cost-effective energy-conversion system.

Preferred embodiments of the invention will now be discussed with respect to experiments and drawings. Broader aspects of the invention will be understood by artisans in view of the general knowledge in the art and the description of the experiments that follows.

FIG. 1A shows a preferred generator-rectifier system and grid interface 100 coupled to a wind turbine 102. The turbine drives a multi-power PMSG 104 having k three-phase ac ports. One of the k ac ports is connected to an active rectifier 106. If more than one of the k ac ports is connected to the active rectifier, more power is processed actively and the benefit of the invention is lessened, but some benefit remains. The remaining k ac ports of the PMSG 104 are connected to passive rectifiers 108. Outputs of the active rectifier 106 and the passive rectifier 108 are serially stacked to form an intermediate dc link, Vac. Two isolated dc-dc converters 110 and 112—Converters I and II—act as interfaces between the rectifier outputs and the dc grid. Converters 110 and 112 can also be dc-ac converters to interface to an ac grid.

The active rectifier 106 can be a six-switch two-level active rectifier 120. The passive rectifiers 108 can include passive diode bridge rectifiers 122. In Converters I and II have transformer turns ratios $1:n_1$ and $1:n_2$, respectively. Converter I takes power from $V_{dc}$ while operating at a preferred fixed duty ratio of 0.5, resulting in an input-output voltage conversion ratio of (km). Choosing a fixed duty ratio of 0.5 ensures the maximum utilization of all the switches in the Converter I transformer, thereby resulting in a minimum number of converter modules and/or input voltage requirement for a given grid voltage. Ratios of less that 0.5 are less optimal but can be used, but provide a less efficient operating/design point for Converter I. Operating Converter I with a fixed duty ratio also reduces the control complexity and the number of sensors. Specifically, Converter I does not require circuitry to measure voltage for active voltage balancing, and does not require a closed loop controller to regulate power flow. Switching in Converter I can be implemented in a simple open-loop manner using a microcontroller without any feedback or other communications. Converter II is connected to the active rectifier output ($V_{act}$) while operating with a variable duty ratio d, resulting in a conversion ratio of $(1:2\,d\,n_2)$. The two dc-dc converter outputs are serially stacked to connect the dc grid, $V_{grid}$, through an inductor, $L_{grid}$.

Figure 1B:
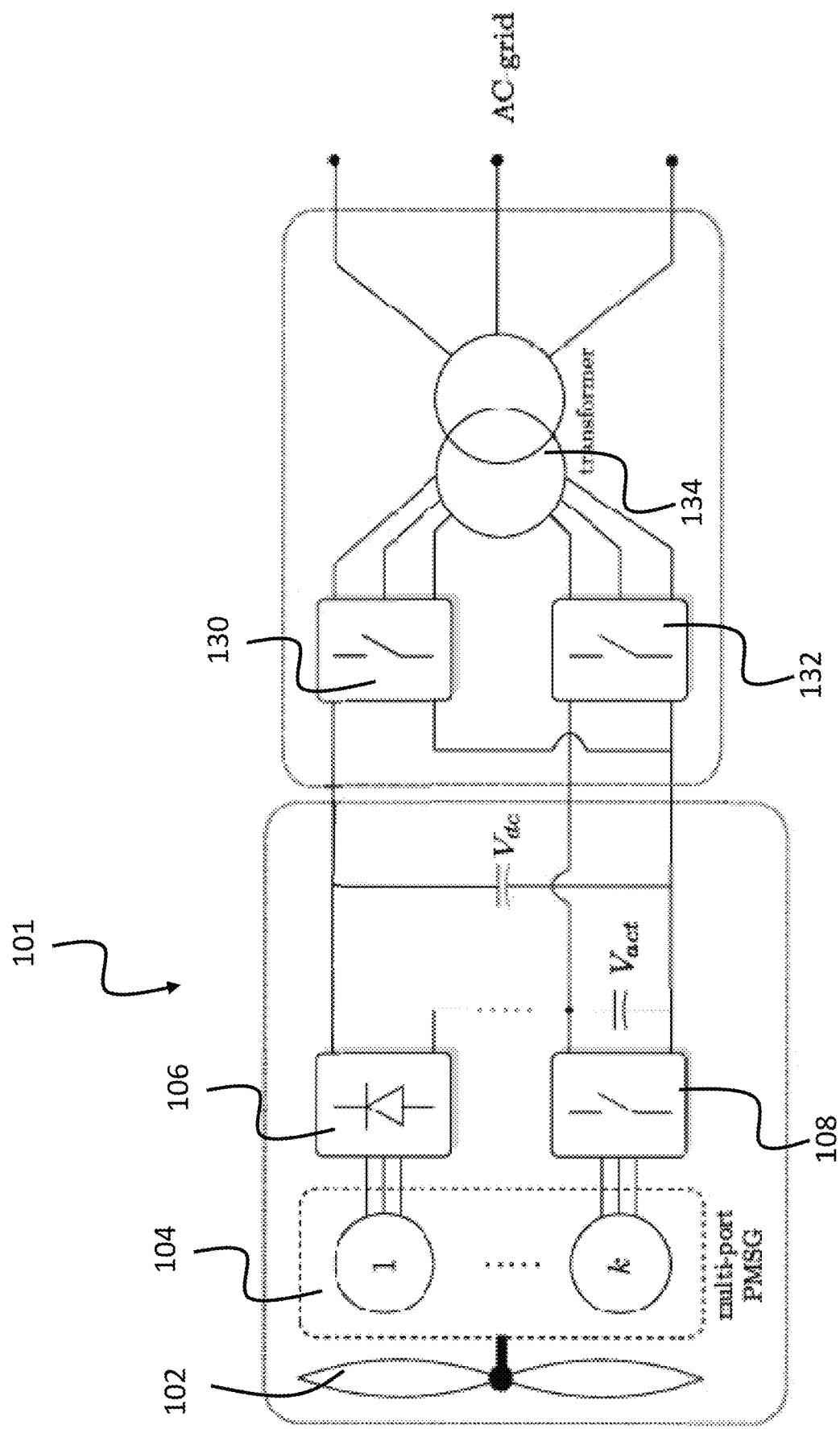
Figure 1C:
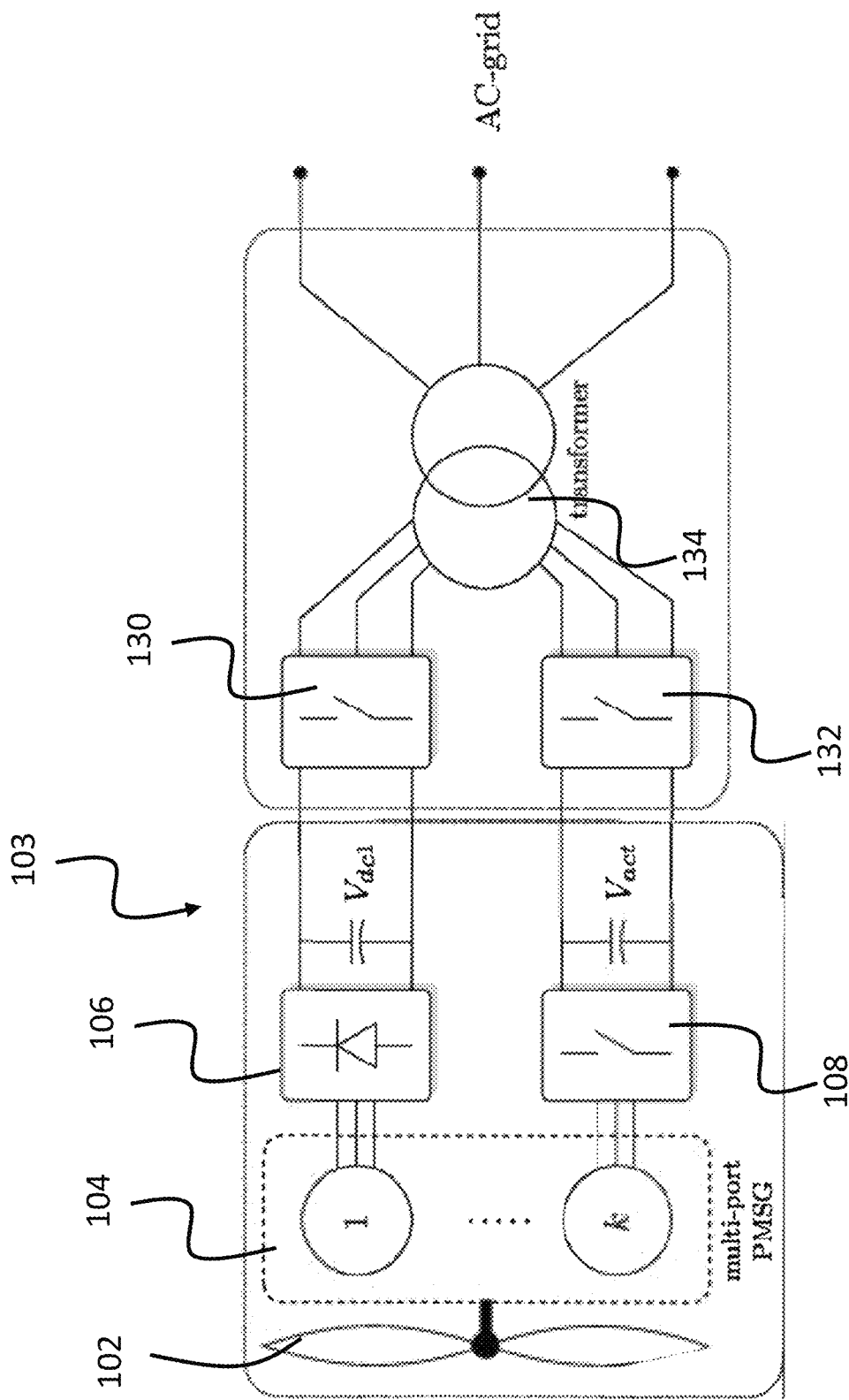

FIG. 1B shows a system 101 for interface to an ac grid (single-phase or multi-phase). Converter I 130 is a dc-to-ac converter and generates a six-step voltage waveform that matches the ac grid frequency. Converter II 132 is a dc-to-ac converter switched at a frequency greater than grid frequency such that the difference of voltages of the two converters contains a sinusoidal component of the ac grid voltage. A transformer 134 provides isolation and a voltage step up or step down to the ac grid as well as provides a mechanism to add or subtract voltages from two converters. FIG. 1C shows a system 103 that is similar to the system 101. In FIG. 1C, outputs of the active rectifier 106 and the passive rectifier 108 are directly connected to the respective Converter I 130 and Converter II 132. Unlike in the system 101, active power cannot circulate between Converter I and Converter II in the system 103. In the converter 101 of FIG. 1B, circulating power between Converter I and Converter II needs to be regulated by a suitable conventional control strategy. In the dc-grid system 100 of FIG. 1A circulating power is not a concern between Converter I and II because of diodes at the secondary of the transformer in Converter II. Stacking of the outputs is preferred in FIG. 1A because removing the stacking will increase the total switch volt-ampere rating.

An objective is to minimize the sum of VA (volt-amp) rating of all the active switches used in the entire architecture, including the active rectifier 106 as well as the isolated dc-dc converters 110 and 112 (Converters I and II). The design variables are the number of ac ports k and voltage conversion ratios of the dc-dc converters $n_1$ and $2 \, dn_2$, while the turbine 102 operates over a speed range of 0.55 to 1 p.u., similar to that of doubly-fed induction-generator-based wind-energy conversion systems.

The control objective for a dc-ac conversion is the same, namely to allow $V_{act}$ to remain constant across all speed and allow $V_{dc}$ to vary. This permits use of a lower power rated active rectifier 108 compared to conventional approaches. Operationally, Converter I can run a six-step ac waveform, for example, and process a large majority of the power. Converter II can run a high frequency switching waveform to process the remaining power.

Active Rectifier Output Voltage as a Function of Design Variables

The maximum active rectifier output voltage determines the switch voltage rating of the active rectifier 106 and Converter II 112. The generator EMF is proportional to its rotational speed, and the peak line-to-neutral induced EMF of each port is expressed as:

$$E_\omega = \frac{\omega E_0}{k} \tag{1}$$

where $E_0$ is the sum of the EMFs for all the generator ports at rated speed $\omega_0$ and $\omega$ is the normalized generator speed. Neglecting the generator winding resistance and the diode voltage drop, the dc output voltage of each passive rectifier is:

$$V_{pas} = \underbrace{\frac{3\sqrt{3}}{\pi} E_\omega}_{V_p} - \underbrace{\frac{3}{\pi}\omega\omega_0 L I_{dc,1}}_{V_x} \tag{2}$$

where L is the generator synchronous inductance and $I_{dc,1}$ is the output current of the passive rectifiers 108 averaged over a fundamental period. The passive rectifiers 108 are assumed to be operated in Mode I with the commutation angle less than $\pi/3$. In this mode, three out of six diodes in the bridge 122 conduct during the commutation interval and the input-output voltage relationship follows (2). Passive rectifiers in this architecture are the line-commutated rectifiers operating at ac fundamental frequency. Hence, the maximum blocking voltage of these diodes is equal to the peak of the line-to-line voltage, i.e., $\sqrt{3}E_\omega$. As Converters I and II operate with voltage conversion ratios of $1:n_1$ and $1:2 \, d \, n_2$, respectively, the dc grid voltage is:

$$V_{grid} = n_1[(k-1)V_{pas} + V_{act}] + 2dn_2 V_{act} \tag{3}$$

where is the dc output voltage of the active rectifier. At rated generator speed, the controllability of the active rectifier requires:

$$V_{act} \geq \frac{\sqrt{3} E_0}{k}. \tag{4}$$

Operating the active rectifier at its minimum controllable output voltage and Converter II with duty ratio d=0 ensures that minimum power is processed by the active rectifier at the rated speed. Using (2) and (4), (3) can be expressed as:

$$V_{grid} = \frac{3n_1(k-1)}{\pi}\left[\frac{\sqrt{3}E_0}{k} - \omega_0 L I_{dc,1,0}\right] + \frac{\sqrt{3}n_1 E_0}{k} \tag{5}$$

where $I_{dc,1,0} = I_{dc,1}$ at rated generator speed. This equation gives the required transformer turns ratio of Converter I, $n_1$, as a function of k. To follow this grid voltage, $V_{grid}$, at all the operating speeds, the variation of active rectifier dc-link voltage with $\omega$ and d can be calculated from (3) and (5) as:

$$V_{act}(n, k, d, \omega) = \tag{6}$$

$$\left[\left(\frac{3(k-1)(1-\omega)}{\pi} + 1\right)\frac{\sqrt{3}E_0}{k} - \frac{3(k-1)\omega_0 L}{\pi}(I_{dc,1,0} - I_{dc,1}\omega)\right]\frac{1}{(1+2dn)}$$

where $n = n_2/n_1$. Equation (6) highlights that the active rectifier dc-link voltage depends on the generator speed $\omega$, number of ports k, and the duty ratio of Converter II, d.

The active rectifier processes a small amount of the incoming power at the rated condition. In an example, active rectifier processes $\frac{1}{5}^{th}$ of the incoming power at the rated condition. The passive rectifier processes $\frac{4}{5}^{th}$ of the power at the rated condition. Converter I processes the entire power at rated condition. Converter II process a small fraction, e.g. a maximum of 8% power, at the minimum speed.

Active Rectifier Input Current as a Function of Design Variables

The maximum active rectifier input current determines the active rectifier's switch current rating. Assume that the active rectifier is lossless and operating at unity power factor gives:

$$P_{act} = \tfrac{3}{2} E_\omega I_{ac} = V_{act}(I_{dc,1} + I_{dc,2}) \tag{7}$$

where $P_{act}$ is the power processed by the active rectifier, $I_{ac}$ is the peak ac line current, and $I_{dc,2}$ is the current drawn by Converter II averaged over one fundamental period, respectively. $I_{dc,1}$ and $I_{dc,2}$ can be expressed in terms of the dc grid current, $I_{grid}$, following the conversion ratio of the corresponding dc-dc converters as:

$$I_{dc,1} = n_1 I_{grid}$$

$$I_{dc,2} = 2dn_2 I_{grid}. \tag{8}$$

Using (1) and (8) in (7) yields:

$$I_{ac} = \frac{2k V_{act}}{3\omega E_0}(n_1 + 2dn_2)I_{grid}. \tag{9}$$

In a wind energy system, maximum power extraction at different wind speeds is achieved by delivering power to the grid following a cubic relationship with $\omega$. For a constant grid voltage, this relationship results in:

$$I_{grid} = C_{MPP}\omega^3 \tag{10}$$

where $C_{MPP}$ is a proportionality constant. Equations (10) and (9) result in:

$$I_{ac}(n_1, n_2, k, d, \omega) = \frac{2kV_{act}}{3E_0}(n_1 + 2dn_2)C_{MPP}\omega^2. \quad (11)$$

Normalization

The next step is to normalize (6) and (11) to make this design procedure independent of actual values of $V_{grid}$, $E_0$, $\omega_0$, and rated power. Using current and voltage base values as:

$$I_{base} = n_1 C_{MPP} \text{ and}$$

$$V_{base} = \sqrt{3}E_0 \quad (12)$$

respectively, the normalized active rectifier output voltage is:

$$V_{act,pu}(n, d, k, \omega) = \quad (13)$$

$$\left[\left(\frac{3(k-1)(1-\omega)}{\pi} + 1\right)\frac{1}{k} - \frac{3(k-1)L_{pu}}{\pi k}(1-\omega^4)\right]\frac{1}{(1+2dn)}$$

where $L_{pu}$ is the generator synchronous inductance normalized by $L_{base} = V_{base}/k\omega_0 I_{base}$ Similarly, the normalized active rectifier input current is:

$$I_{ac,pu} = \frac{2kV_{act,pu}}{\sqrt{3}}(1+2dn)\omega^2. \quad (14)$$

Using (13) in (14) yields $$I_{ac,pu}(k,\omega) = \frac{2k\omega^2}{\sqrt{3}}\left[\left(\frac{2k\omega^2}{\sqrt{3}} + 1\right)\frac{1}{k} - \frac{3(k-1)(1-\omega)}{\pi}(1-\omega^4)\right]. \quad (15)$$

Figure 2:
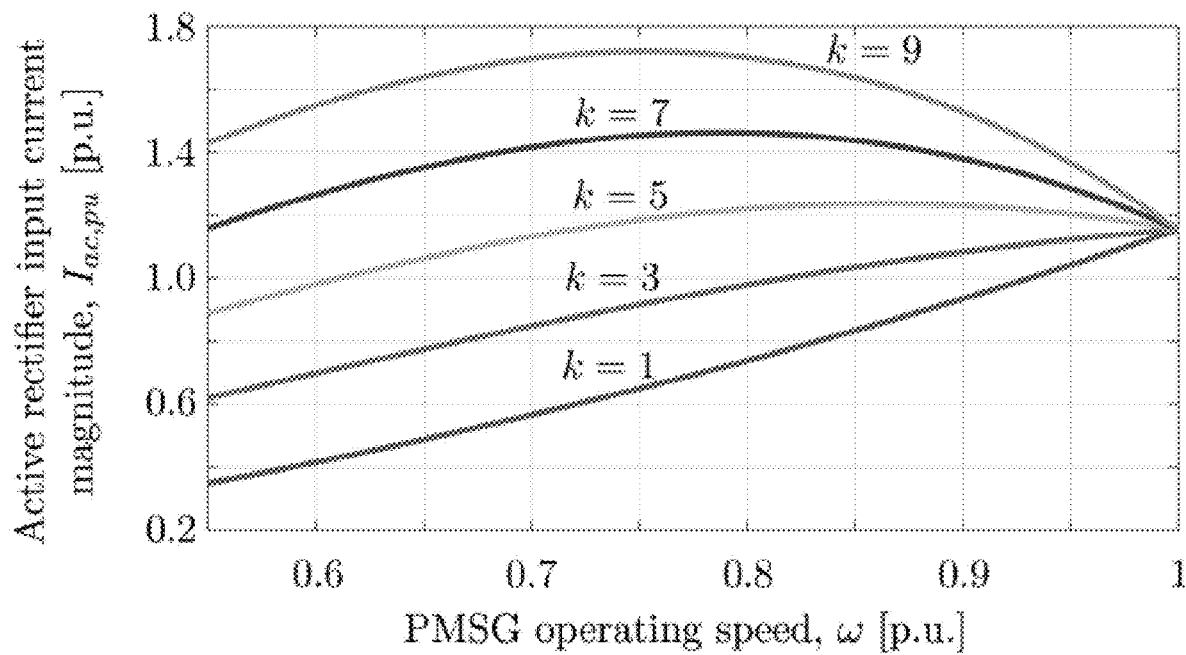
FIG. 2 is a plot of variation of the FIG. 1 active rectifier input current magnitude with the operating speed of the wind turbine for different numbers of ac ports.

This equation shows that the normalized active rectifier input current is independent of n and d. Assuming $L_{pu}$ as 0.05, FIG. 2 illustrates the variation of $I_{ac,pu}$ with co for different numbers of ac ports k.

Minimization of the Total Switch VA Rating

The total normalized switch VA rating of the generator-rectifier system and grid interface 100 is:

$$VA_{total,pu} = VA_{ConvI,pu} + VA_{ConvII,pu} + VA_{act,pu} \quad (16)$$

where $VA_{Conv\ I,pu}$, $VA_{Conv\ II,\ pu}$, and $VA_{act,\ pu}$ are the normalized VA ratings of Converter I, Converter II, and the active rectifier 106, respectively. Converter I consists of four active switches; therefore, its total switch VA rating is:

$$VA_{ConvI} = 4\frac{V_{grid}}{n_1} \times \max(n_1 I_{grid}) \quad (17)$$

$$= 4C_{MPP}V_{grid}$$

as grid current is maximum at rated speed, $\omega=1$. Using (5) in (17) followed by normalization results in:

$$VA_{ConvI,pu} = \frac{4}{k}\left[\frac{3(k-1)(1-L_{pu})}{\pi} + 1\right]. \quad (18)$$

Converter II consists of four active switches as well. Therefore, its total switch VA rating is:

$$VA_{ConvII} = 4\max(V_{act}) \times \max(n_2 I_{grid}) = 4n_2 C_{MPP} \max(V_{act}). \quad (19)$$

Normalizing this equation yields:

$$VA_{ConvII,pu} = 4n\max(V_{act,pu}) \quad (20)$$

where $V_{act,\ pu}$ is obtained from (13). Similarly, the normalized switch VA rating of the two-level six-switch active rectifier can be obtained as:

$$VA_{act,pu} = 6[\max(V_{act,pu}) \times \max(I_{ac,pu})]. \quad (21)$$

As the design objective is to minimize the total normalized switch VA rating, the optimization is expressed as:

$$\min_{k,d,n} VA_{total,pu} \quad (22)$$

s.t. $\omega \in [0.55, 1]$ $k > 1$ $n \geq 0$ $d \in [0, 0.5]$.

For k ac ports, solving this optimization results in:

$$n_{opt,k} = \underset{n}{\operatorname{argmin}}(VA_{total,pu}). \quad (23)$$

Figure 3:
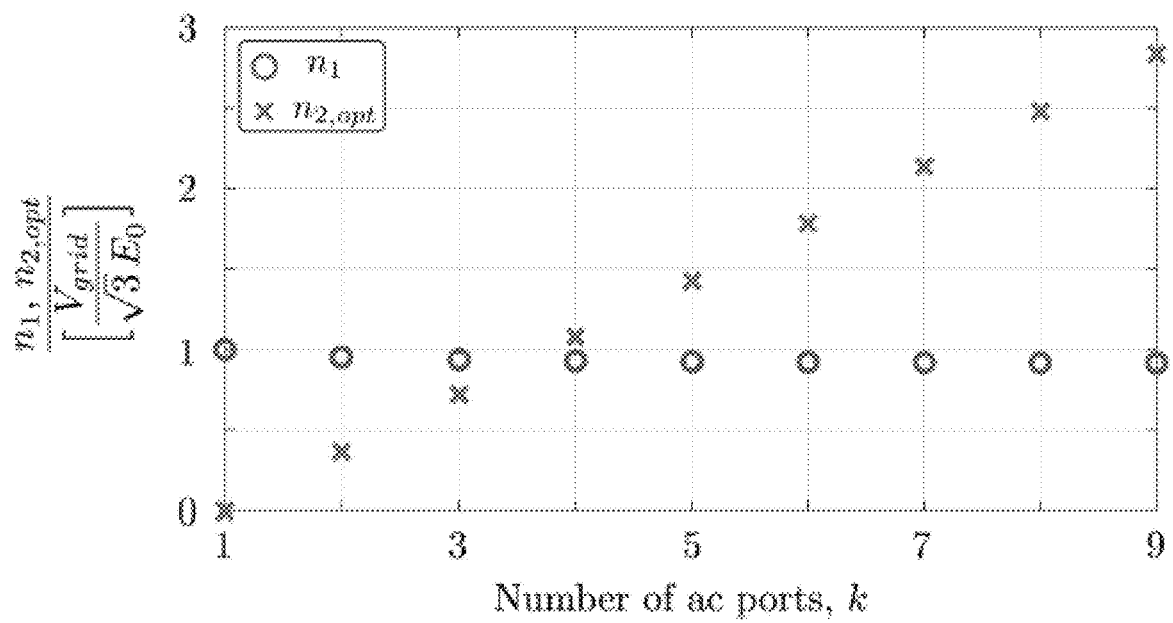
FIG. 3 shows optimum transformer turns ratios of FIG. 1 Converters I and II as functions of the number of PMSG ac ports k.
Figure 4:
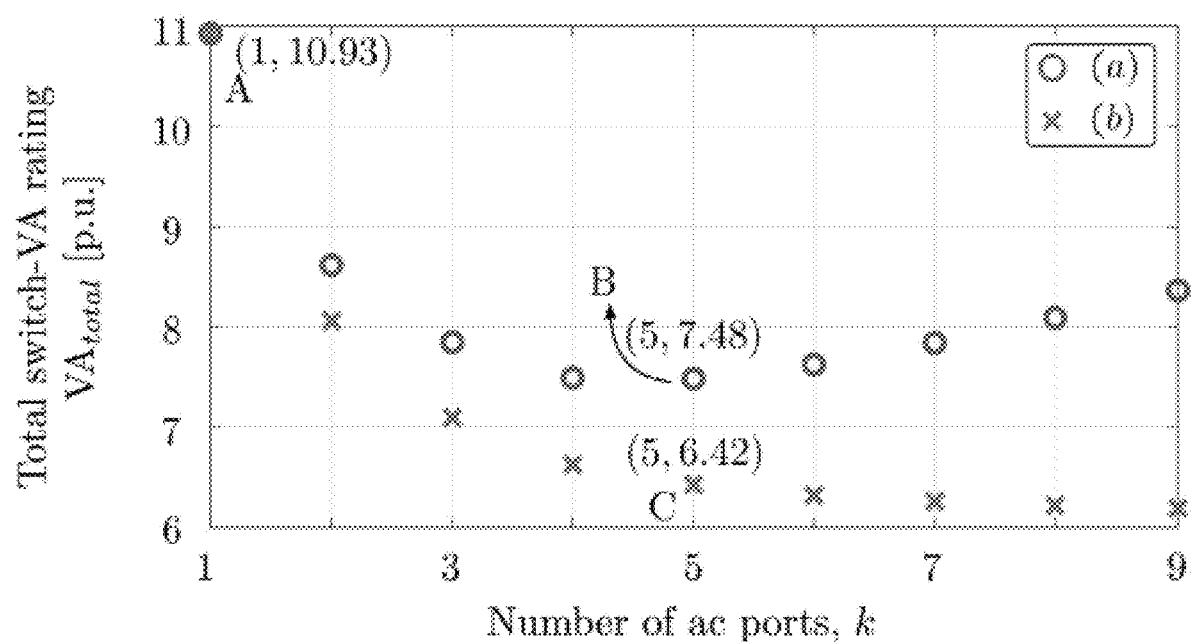
FIG. 4 shows total switch VA rating requirement for different numbers of ac ports k without and with the FIG. 1 Converter II.

$n_1$ is computed from (5) and the optimum transformer turns ratio for Converter II, $n_{2,opt} = n_1 n_{opt,k}$. Variations of $n_1$ and $n_{2,opt}$ as functions of the number of ac ports are shown in FIG. 3. FIG. 4 shows the minimum switch VA rating requirement as a function of k. Three design points are highlighted illustrate an advantage of the system 100. Point A refers to a design architecture with only one generator ac port that is connected to an active rectifier followed by a grid-tied fixed-duty dc-dc converter. The total switch VA rating requirement for this design case is 10.93 p.u. Point B refers to a design architecture, where the output of a five-port integrated generator-rectifier that is connected to a grid-tied fixed-duty dc-dc converter as in P. T. Huynh, P. J. Wang, and A. Banerjee, "An integrated permanent-magnet-synchronous generator-rectifier architecture for limited-speed-range applications," IEEE Trans. Power Electron., vol. 35, no. 5, pp. 4767-4779, May 2020. In this case, the required total switch VA rating is 7.48 p.u. Finally, point C refers to the present grid interface 100 with a five-port integrated generator-rectifier, where the two dc-dc converters, Converters I and II, work together to reduce the total switch VA rating to 6.42 p.u.

Figure 5A:
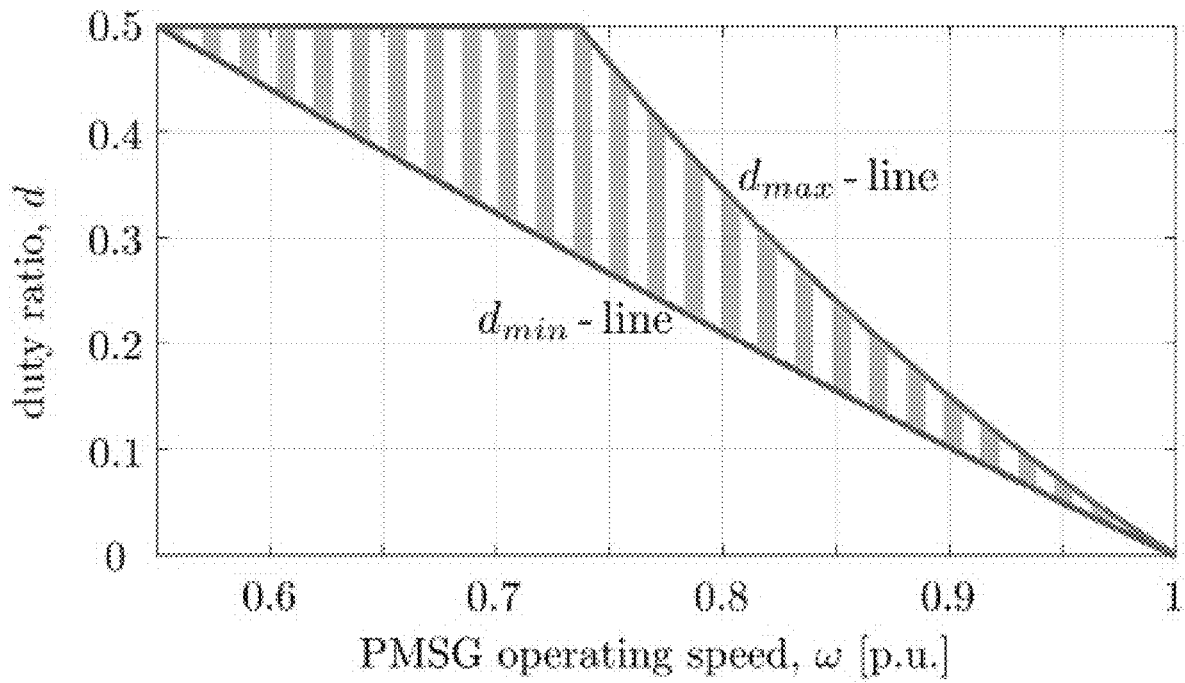
FIGS. 5A and 5B respectively show (A) operating range of duty ratio d versus PMSG operating speed for k=5 and n=$n_{opt}$. (B) variation of the active rectifier dc-link voltage ($V_{act,pu}$) corresponding to that duty rating range.
Figure 5B:
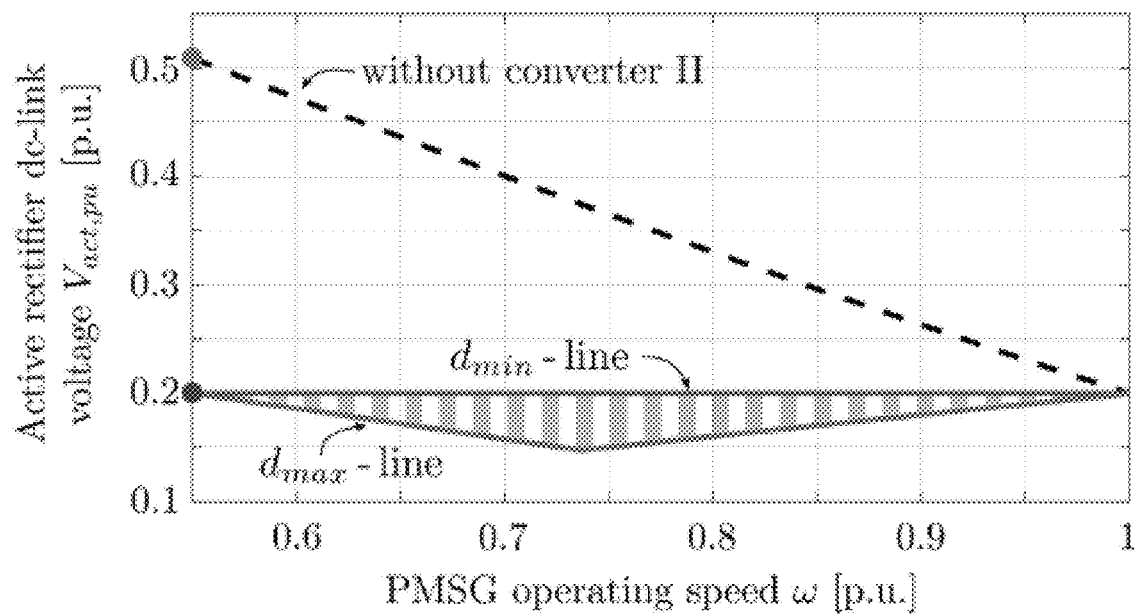

The substantial reduction in the total switch VA rating can be predominantly attributed to the reduction in the active rectifier dc-link voltage rating. With the optimized design for a five-port generator, FIG. 5A shows the allowable duty ratio d for Converter II. The $d_{max}$ line signifies the lowest bound of the active rectifier voltage required to maintain desired power flow control. However, operating along the drain line ensures that the active rectifier output voltage remains constant and equal to its value at the rated speed. Operating Converter II within this region guarantees that the maximum of the active rectifier output voltage remains at 0.2 p.u. independent of the speed, as shown in FIG. 5B. In contrast, the absence of Converter II increases the voltage to 0.51 p.u., resulting in an increase in the switch VA rating. Therefore, for a five-port system with $n_2=n_{2,opt}$, the active rectifier voltage rating is reduced by 60.7% in the present interface 100.

A 10-MW Wind-Turbine-Driven Multiport PMSG Example

Figure 6:
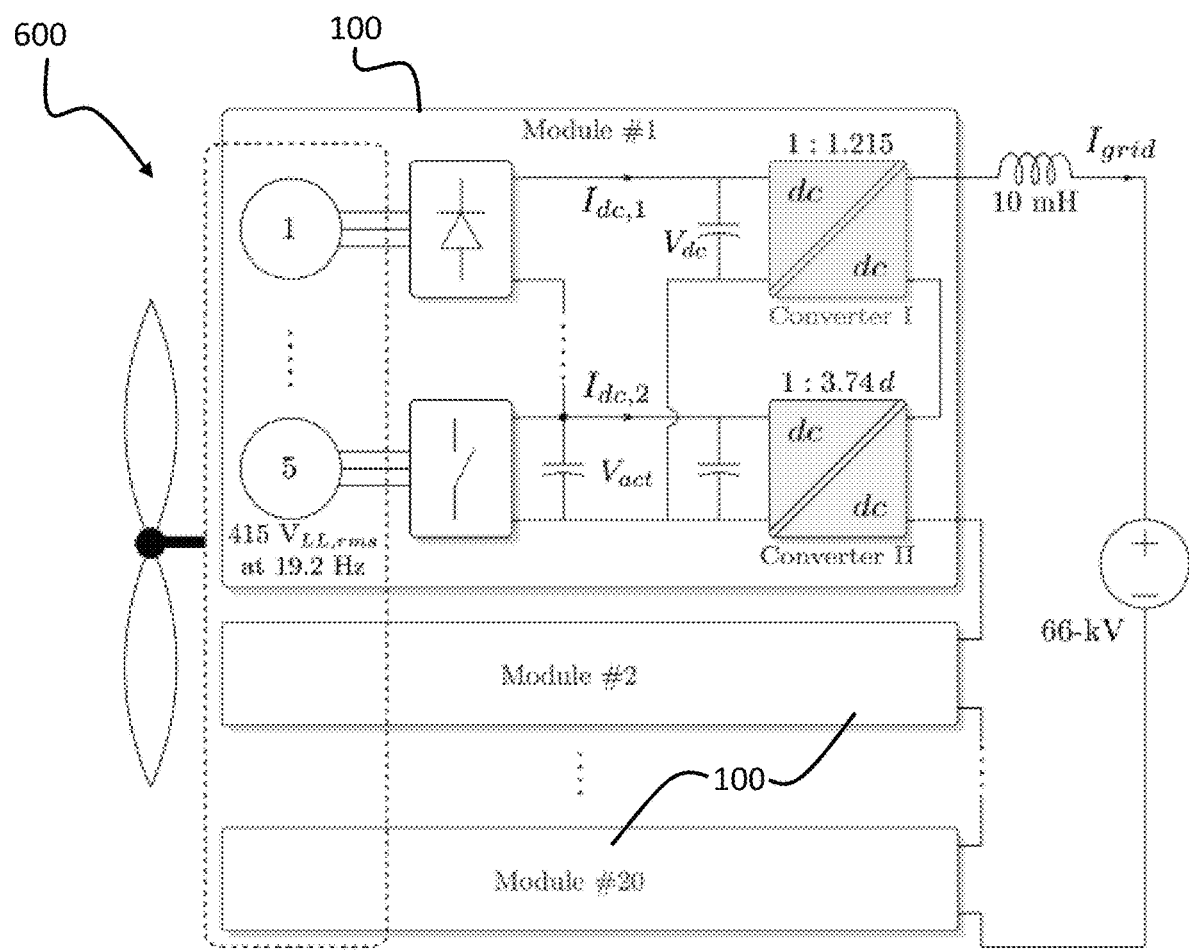
FIG. 6 shows a preferred 10-MW wind-turbine-driven multiport PMSG of the invention with a plurality of generator-rectifier systems and grid interfaces according to FIG. 1.

FIG. 6 shows a 10-MW wind-turbine-driven multiport PMSG 600 with a plurality of generator-rectifier system and grid interfaces 100 of the invention. At a rated rotational speed of 9.6 r/min, each generator port is assumed to generate a line-to-line rms voltage of 415 V with a frequency of 19.2 Hz. One active and four passive rectifiers, along with two isolated dc-dc converters, are connected as discussed above to form each module 100. Twenty such modules 100 are stacked in series to connect the wind turbine output to a 66-kV dc grid through a 10-mH inductor.

The synchronous inductance of the PMSG is chosen to be 1.3 mH, which is p.u. The ratings and parameters of the system are tabulated in Table I. Based on the above ratings and parameters, $n_1$ and $n_{2,opt}$ are calculated as 1.215 and 1.87, respectively. The required voltage and current ratings of the semiconductor devices can be calculated as explained above.

The devices are then selected with reasonable safety factors, as tabulated in Table II. The conventional dc grid interface architecture where Converter II is absent is also designed for comparison. The total switch VA rating for the conventional architecture is 15.41×10⁶ VA whereas it is reduced to 11.9×10⁶ VA (a saving of 22.8%) with the interfaces 100. The analytical results, as shown in FIG. 4, indicate a saving of 14.2% in switch VA rating requirement for a five-port system. This difference between the analytical results and the design example is due to the nonavailability of devices with exact required ratings. In addition, a reduction in the switch VA rating translates into the improved system efficiency. This generalized design framework for the converter architecture is independent of the type of the devices used. Insulated gate bipolar transistors (IGBTs) were used to make the comparisons in this example. A similar analysis can be performed using silicon carbide devices.

TABLE I

SYSTEM PARAMETERS

| Quantity | Value |
|---|---|
| Rated power | 10 MW |
| Rated speed | 9.6 r/min |
| Rated fundamental frequency | 19.2 Hz |
| Number of ports in a module, k | 5 |
| Number of modules, m | 20 |
| Line to line rms voltage per port | 415 V |
| Generator inductance per port per phase, L | 1.3 mH |
| DC grid voltage, $mV_{grid}$ | 66 kV |
| Converter I turns ratio, $(1:n_1)$ | 1:1.215 |
| Converter II turns ratio, $(1:n_2)$ | 1:1.87 |

TABLE II

REQUIRED DEVICE RATINGS AND THEIR SELECTION

| Required ratings | | | Device ratings | |
|---|---|---|---|---|
| Voltage | Current | Selected device | Voltage | Current |
| Passive rectifier | | | | |
| 587 V | 184 A | Diode: SKN 320/08 | 800 V | 320 A |
| | | Converter I | | |
| 2741 V | 184 A | IGBT: FZ250R65KE3 | 6500 V | 250 A |
| 3330 V | 152 A | Diode: DD250S65K3 | 6500 V | 250 A |
| | | Converter II | | |
| 587 V | 283 A | IGBT: FZ400R12KE3 | 1200 V | 400 A |
| 1098 V | 152 A | Diode: BYM600A170DN2 | 1700 V | 400 A |
| Active rectifier for the proposed dc grid interface | | | | |
| 587 V | 232 A | IGBT: FZ400R12KE3 | 1200 V | 400 A |
| Active rectifier for the conventional dc grid interface | | | | |
| 1501 V | 232 A | IGBT: FF450R33T3E3 | 3300 V | 450 A |

Figure 7A:
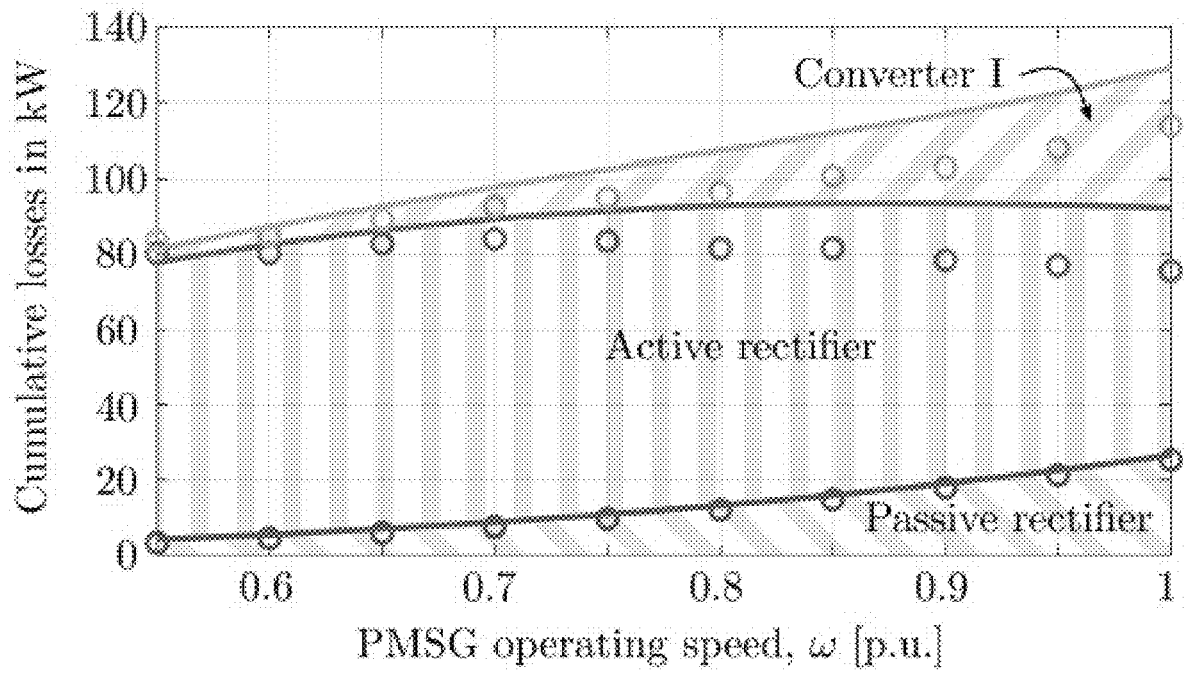
FIGS. 7A and 7B are analytical and simulation results of cumulative losses within the converters of (a) conventional and (b) present architectures for the 10-MW wind energy system of FIG. 6.
Figure 7B:
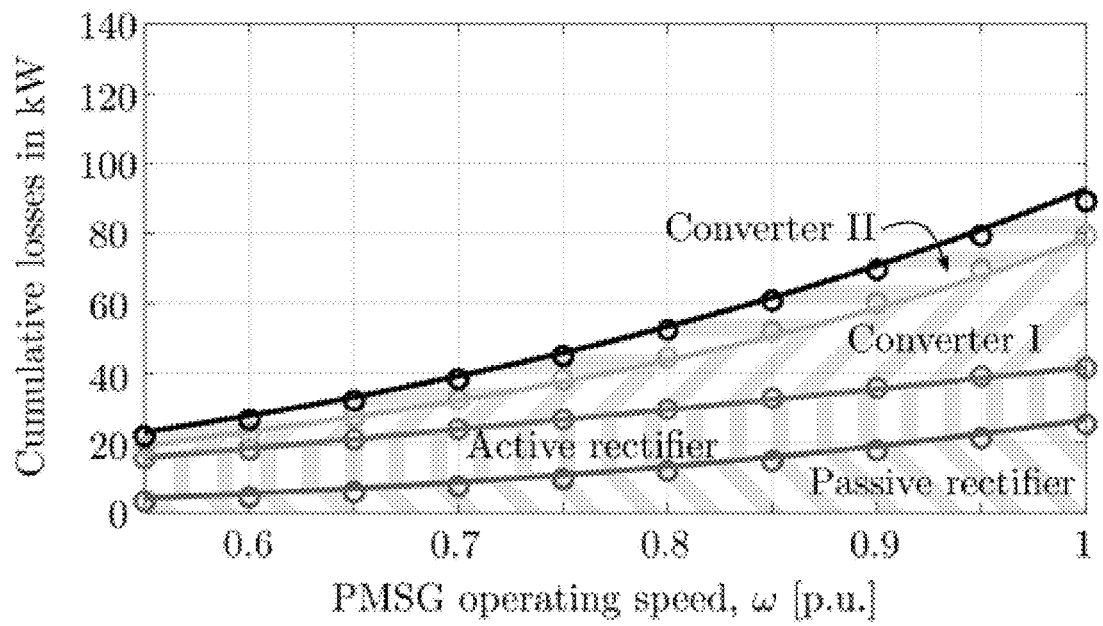
Figure 8:
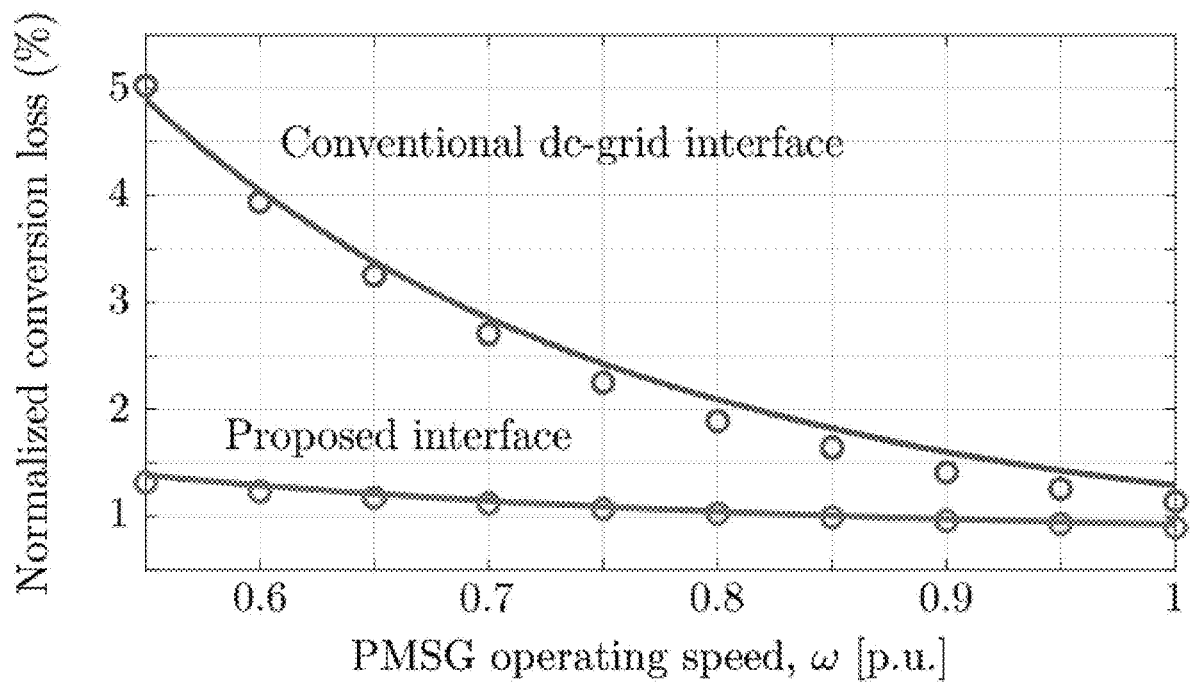
FIG. 8 includes analytical and simulation results or total conversion loss in normalized values for the 10-MW wind energy system of FIG. 6.

The present topology is compared with the conventional dc grid interface in terms of the losses within the individual converters, as shown in FIG. 7. The losses within the active rectifier in the present topology are substantially reduced. This is due to the use of low-voltage devices for the active rectifier and its regulated dc-link voltage. The architectures are also compared in terms of FIG. 8. The conversion loss is reduced due to the present architecture by 28.3% at the rated speed and 71.7% at the minimum speed. The difference in the results obtained from the simulation and the analysis is primarily due to the way the device characteristics have been captured in the loss model. In the PLECS simulation, multiple data points have been used, whereas curve-fitting equations were used in the analysis.

Control Strategy

Figure 9:
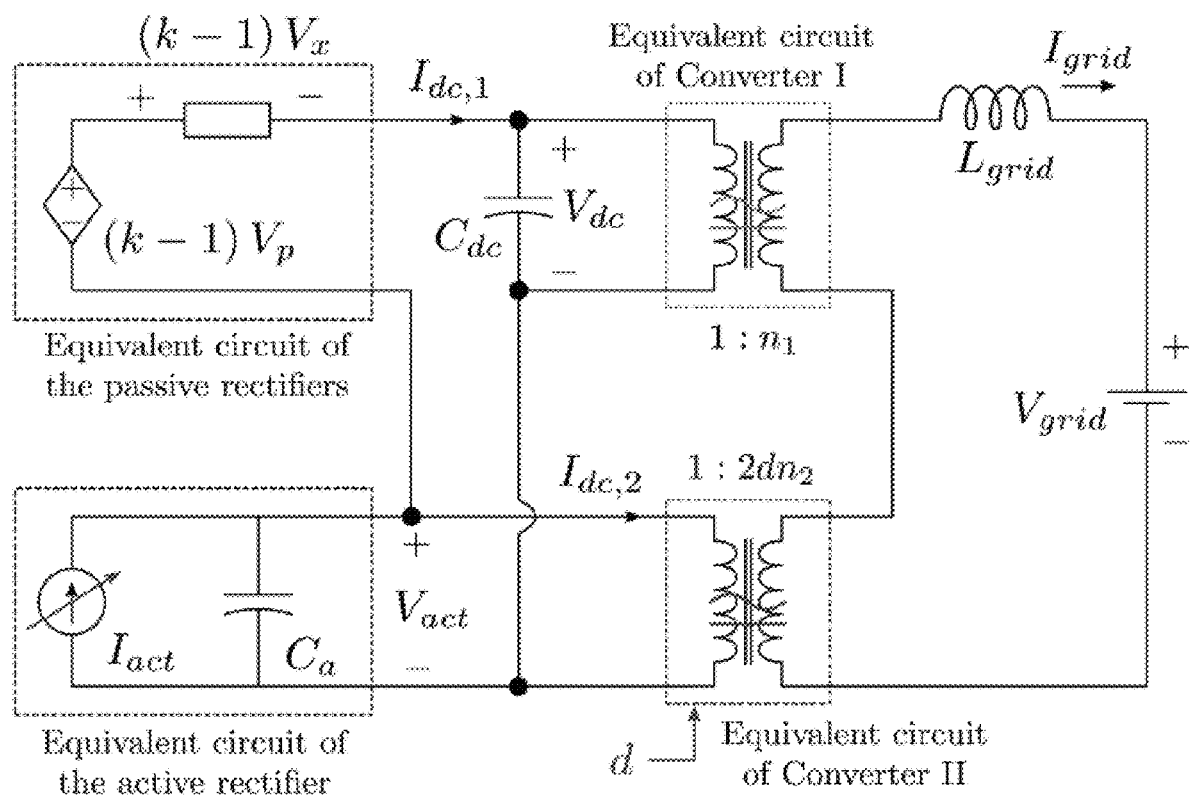
FIG. 9 is a s witching cycle average model of the FIG. 1 generator-rectifier system and grid interface.

A preferred control strategy for the generator-rectifier system and grid interface 100 or the system 600 is discussed next. The strategy is discussed with the interface or system connected to a stiff dc grid, i.e., a grid whose voltage is actively regulated to maintain a relatively constant voltage. A switching cycle average model of the system is shown in FIG. 9. The passive rectifiers are modeled as a generator-speed-dependent voltage source in series with an impedance representing the voltage drop due to commutation. The active rectifier is modeled as a controllable current source in parallel with a capacitor. Converters I and II are modeled as dc transformers with their voltage conversion ratio ($1:n_1$) and ($1:2\ d\ n_2$), respectively.

The passive rectifiers 108 and Converter I 110, which is operated at a constant duty ratio of 0.5, do not actively regulate any system variables. The generator-side active rectifier 106 controls the power harvested from the wind and Converter II 112 regulates its input voltage $v_{act}$.

Active Rectifier Control

MPPT ability is achieved if the total generated power follows the optimum cubic relationship:

$$P_{gen,mpp}=C_{p,mpp}\omega^3 \quad (24)$$

where $C_{p,mpp}$ is a characteristic constant of the wind turbine. The active rectifier 106 processes a part of the generated power given by:

$$P_{act}=3/2 E_{sd}I_{sd} \quad (25)$$

Assuming the active rectifier to be lossless, and $E_{sd}$ and $I_{sd}$ are the d-axis components of the generator-induced EMF and current vectors, respectively. The d-axis is considered to be aligned with the generator-induced EMF vector. Therefore, $$E_{sd} = \frac{\omega E_0}{k}, E_{sq} = 0. \tag{26}$$

The power processed by all the passive rectifiers is:

$$P_{pas} = (k-1)V_{pas}I_{dc,1}. \tag{27}$$

Based on (2) and (24)-(27), the active rectifier input current should follow the below equation to ensure MPPT:

$$I_{sd,mpp}(\omega, I_{dc,1}) = \frac{2kC_{p,mpp}\omega^2}{3E_0} - \frac{2\sqrt{3}(k-1)}{\pi}I_{dc,1} + \frac{2k(k-1)\omega_0 L}{\pi E_0}I_{dc,1}^2. \tag{28}$$

Figure 10:
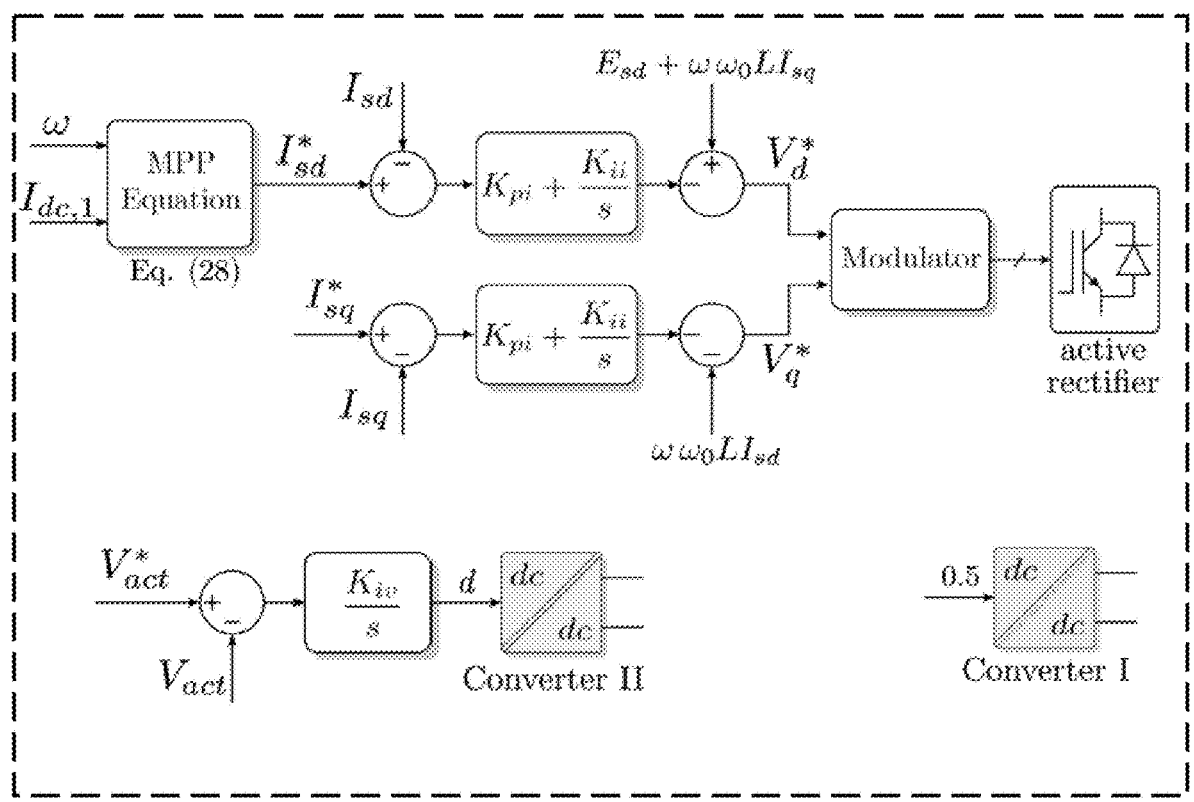
FIG. 10 is a block diagram of a preferred control method of the FIG. 1 generator-rectifier system and grid interface.

This equation is used to create the reference value for the d-axis current. The d- and q-axis current controllers are designed and implemented following a published procedure in P. T. Huynh, P. J. Wang, and A. Banerjee, "An integrated permanent-magnet-synchronous generator-rectifier architecture for limited-speed-range applications," IEEE Trans. Power Electron., vol. 35, no. 5, pp. 4767-4779, May 2020. A block diagram of the active rectifier control strategy is shown in FIG. 10. The FIG. 10 control strategy effectively maintains the dc link voltage of the active rectifier constant at all speeds using converter II and lets the total dc link voltage ($V_{dc}$) vary depending on the speed. The duty ratio control of Converter II allows this, though the dc grid voltage remains constant for all speeds.

Converter II Control

The switch duty ratio of Converter II (d) is used to control the active rectifier dc-link voltage $V_{act}$ following (6), which can be expressed in:

$$V_{act} = \frac{C_1(\omega)}{(1+2dn)} \tag{29}$$

where $$C_1(\omega) = \left[\left(\frac{3(k-1)(1-\omega)}{\pi}+1\right)\frac{\sqrt{3}E_0}{k} - \frac{3(k-1)\omega_0 L}{\pi}(I_{dc,1,0} - I_{dc,1}\omega)\right] \tag{30}$$

is constant at some operating point $\omega = \omega_{op}$. Considering slower dynamics of the wind speed and the rotational speed as compared to that of the active rectifier dc-link voltage, the small-signal model of (29) is:

$$\Delta v_{act} = \frac{2nV_{act,0}}{1+2d_0n}\Delta d \tag{31}$$

where $V_{act,1}$ and do are the steady-state values of $V_{act}$ and d, respectively, around which the system is perturbed and $\Delta v_{act}$ and $\Delta d$ are the corresponding perturbed quantities. The active rectifier dc-link voltage controller, whose output is the duty ratio d of Converter II, can be designed based on the small-signal model (31). An integrator-type controller gain ($K_{iv}$) can be:

$$K_{iv} = -\frac{2nV_{act,0}}{1+2nd_0}\omega_{BW,v} \tag{32}$$

where $\omega_{BW,v}$ is the desired bandwidth of the active rectifier dc-link voltage controller. The control block diagram of Converter II is shown in FIG. 10.

Simulation Results

Simulations were conducted using low-power laboratory prototype and confirmed performance improvements. In a conventional design, active rectifier voltage increases to 73 V as the emulated wind speed falls to its minimum value, 6.6 m/s but was regulated to 53V in the present generator-rectifier system and grid interface. The duty ratio of Converter I remains constant at 0.48 through-out the operating range. The intermediate dc-link voltage, which is also the Converter I input voltage, determines the magnitude of the Transformer I primary voltage waveform. It decreases from 129.7 V at a wind speed of 12 m/s to 98.6 V at 6.6 m/s. The active rectifier dc-link voltage is maintained at 53 V. Therefore, the magnitude of Transformer II primary voltage waveform remains unchanged. However, its duty ratio increases to 0.43 at 6.6-m/s wind speed from 0.02 at 12 m/s.

Dynamic testing showed the MPP tracking ability of the present generator-rectifier and grid interface. With a change of wind speed from a rated 12 to 6.6 m/s, the PMSG rotational speed lowers from its rated value, 150 r/min, to 83 r/min (i.e., close to 0.55×150 r/min or 82.5 r/min) and the generator output power from its rated value, 160 W, to 20 W (i.e., close to (0.55)3×160 W or 26.6 W). At t=5.5 s, the wind speed returns to its rated value and so do the PMSG rotational speed and generator output power. The intermediate dc-link voltage reduces from 129.7 V to 98.6 at t=1.8 s when the wind speed changes from 12 to 6.6 m/s. The voltage again goes back to 129.7 V at t=11.93 s when wind speed reverts to 12 m/s. However, the active rectifier dc-link voltage was regulated within 53 V.

Simulations showed that the additional dc-dc converter in the present design reduces the total switch VA rating by 22.8%, which translates into overall loss reduction ranging between 28.3% and 71.7%, depending on the extracted power. The active rectifier dc-link voltage was shown to be regulated by Converter II.

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

The invention claimed is:

1. A generator-rectifier system and grid interface, comprising:
   an active rectifier configured to accept an input from one of a plurality of ac ports of a multi-port permanent magnet synchronous generator;
   passive rectifiers connected to the others of the plurality of ac ports of the multi-port permanent magnet synchronous generator;
   connections creating outputs of the active rectifier and the passive rectifiers;
   a first converter controlled at a fixed duty ratio driven by the outputs to interface with a dc grid or at a grid frequency switching waveform to create a grid frequency ac output to interface with an ac grid;
   a second converter connected the output of the active rectifier, the second converter being controlled at a variable duty ratio to interface with the dc grid or an above-grid frequency switching waveform to create an above-grid frequency ac waveform to interface with the ac grid; and connections creating a serial stack of outputs of the first and second converters.

2. The generator-rectifier system and grid interface of claim 1, wherein the fixed duty ratio is set and the variable duty ratio is controlled to minimize a sum of volt-amp ratings of switches in the active rectifier, first converter and second converter.

3. The generator-rectifier system and grid interface of claim 1, wherein the first converter and the second converter comprise isolated dc-dc converters.

4. The generator-rectifier system and grid interface of claim 1, wherein the passive rectifiers comprise passive diode bridge rectifiers.

5. The generator-rectifier system and grid interface of claim 4, wherein the active rectifier comprises a multi-level rectifier.

6. The generator-rectifier system and grid interface of claim 1, wherein the passive rectifiers comprise line-commutated rectifiers operating at an ac fundamental frequency of the multi-port permanent magnet synchronous generator.

7. A wind energy system comprising generator-rectifier system and grid interface of claim 1, a wind turbine, and a grid connection, wherein the multi-port permanent magnet synchronous generator is driven by the wind turbine and the grid connection is connected to the serial stack of outputs of the first and second converters.

8. The generator-rectifier system and grid interface of claim 1, comprising a plurality of modules, wherein each module comprises an active rectifier configured to accept an input from one of the plurality of ac ports of a multi-port permanent magnet synchronous generator;

passive rectifiers connected to the others of the plurality of ac ports of the multi-port permanent magnet synchronous generator;

connections creating outputs of the active rectifier and the passive rectifiers;

a first converter controlled at a fixed duty ratio driven by the outputs to interface with a dc grid or at a grid frequency switching waveform to create a grid frequency ac output to interface with an ac grid;

a second converter connected the output of the active rectifier, the second converter being controlled at a variable duty ratio to interface with the dc grid or an above-grid frequency switching waveform to create an above-grid frequency ac waveform to interface with the ac grid.

9. The generator-rectifier system and grid interface of claim 8, wherein the others of the plurality of ac ports comprises the remainder of the plurality of ac ports.

10. The generator-rectifier system and grid interface of claim 1, wherein the others of the plurality of the ac ports comprises the remainder of the plurality of the ac ports.

11. The generator-rectifier system and grid interface of claim 1, wherein the fixed duty ratio is ~0.5.

12. The generator-rectifier system and grid interface of claim 1, wherein the active rectifier is controlled such that serial stack of outputs of the first and second converters have a cubic relationship with a speed of a source driving multi-port permanent magnet synchronous generator.

13. The generator-rectifier system and grid interface of claim 1, wherein the active rectifier is controlled such that the first converter processes all power from the input at a rated condition the multi-port permanent magnet synchronous generator and a most of the power from the input at a minimum speed of the multi-port permanent magnet synchronous generator.

14. The generator-rectifier system and grid interface of claim 13, wherein the active rectifier is controlled such that the second converter processes a small fraction of the power from the input at the minimum speed.

* * * * *